June 23, 1970    F. O. JOHNSON ET AL    3,516,233
LIGHTWEIGHT RIDEABLE GREEN MOWER Filed May 7, 1969    5 Sheets-Sheet 1

INVENTORS
FAY O. JOHNSON
WILLIAM L. JOHNSON SR.
BY WILLIAM L. JOHNSON JR.

ATTORNEYS

June 23, 1970  F. O. JOHNSON ET AL  3,516,233
LIGHTWEIGHT RIDEABLE GREEN MOWER

Filed May 7, 1969  5 Sheets-Sheet 4

INVENTORS
FAY O. JOHNSON
WILLIAM L. JOHNSON SR.
BY WILLIAM L. JOHNSON JR.

ATTORNEYS

United States Patent Office 3,516,233
Patented June 23, 1970

3,516,233
LIGHTWEIGHT RIDEABLE GREEN MOWER
Fay O. Johnson, 1652 MacNider; William L. Johnson, Sr., 5535 Cascade Road; and William L. Johnson, Jr., 7221 Driftwood, all of Grand Rapids, Mich. 49506
Filed May 7, 1969, Ser. No. 822,602
Int. Cl. A01d 75/30
U.S. Cl. 56—6
34 Claims

ABSTRACT OF THE DISCLOSURE

A rideable green mower with two mowing units pivotally mounted on a front frame and one mowing unit pivotally mounted on a rear frame. Each front mowing unit is connected to levers extending outwardly from a rotatably mounted axle which is rotatable by a hand operated U-shaped lever or by a foot pedal. The rear mowing unit is similarly connected to a foot pedal. A front drive assembly drives the reels of the front mowing units and a rear drive assembly drives the reel of the rear mowing unit.

BACKGROUND

Golf has become an extremely popular sport in recent years and many golf courses have added nine, eighteen or even more holes in addition to the standard eighteen holes in order to accommodate the tremendous influx of enthusiasts. Most courses are so busy that their greens are occupied from dawn until dark. While this brings a welcome flow of income to the course owner, it presents a myriad of problems for the caretakers. Mowing the fairways is still not a particularly grave problem since it can be done with a large tractor having a large bank of individual mowing units. The moving of greens, however, becomes a particularly nettlesome problem.

The mowing of greens has been done exclusively with hand mowers. It takes over twelve man hours to cut eighteen greens, including the time of transportation of the mower from one green to another. Because the time which is available for mowing greens is extremely limited, it is generally necessary to use several operators. The use of rideable tractors having a number of mowing units mounted thereon has been impossible due to various limitations of existing rideable mowers.

One such limitation arises from the fact that the use of a plurality of mowing units on a single tractor to mow a given area necessitates the use of at least parallel lines of mowers, each perpendicular to the line of travel of the tractor, in order to cut a single swath of grass in a single pass over an area. In mowing greens, this means that the first line of mowers must first be raised at the edge of the green and then the second line of mowers must be raised at the same point at the edge of the green. The same sequence must be followed when the mowing units are again lowered onto the green. In the present state of the art, there is either no available mechanism for simultaneously lifting all of the mowing units in a front line and then simultaneously lifting all of the mowing units in a rear line, or else there is no structure in which this can be done conveniently and frequently during the course of operation of the mower. For example, the operation of many existing lifting mechanisms tie the operator's hands such that he cannot simultaneously drive his tractor.

Furthermore, the complicated mechanisms which are presently available for raising and lowering mowing units require the use of a heavy and bulky tractor which could do irreparable damage to a green surface. Hydraulic mechanisms are generally not preferable because they require a heavier tractor for carrying the bulky hydraulic equipment. Additionally, hydraulic systems frequently have small leaks which would leave unsightly spots or even trails of oil on the green surface. Furthermore, the necessity of using bulkier tractors for mounting these mechanisms greatly hampers their maneuverability, a feature which is essential to a green mower since it must frequently change directions.

Finally, the art does not disclose drive mechanisms for the mowing reels which are amenable to a light construction of the type necessary for use in an apparatus which the mowing units must frequently be raised and lowered during the course of operation.

SUMMARY

The present invention provides a rideable, driveable green mower which is operable by a single operator. It includes a tractor having a first set of mowing units mounted thereon, each being mounted adjacent each other, and a second set of mowing units mounted thereon, each being adjacent each other. Each mower in the second set is wider than the space between adjacent mowers in the first set and each space between adjacent mowing units in the first set is in line with a mowing unit in the second set such that the first and second sets of mowing units cut a single swath of grass. A lift means is operably connected to each mowing unit in each set of mowing units and each set includes a connecting means operably joining all of said lift means. Each set further includes an activating means operably connected therewith. Each of these activating means can be operated to simultaneously activate all of the lift means in its particular set of mowing units and thereby raise or lower all of the mowing units in that particular set. The operator can operate one of these activating means by the use of a first one of his appendages and he can operate the other by the use of a second one of his appendages.

Hence, this invention provides a simple structure which can be frequently operated during the course of mowing without a great deal of confusion and lost motion and without interferring with his operation of the tractor. The operator can separately raise or lower the front and rear sets of mowing units without leaving the seat of the tractor and without diverting his attention from his steering, breaking and general operation of the tractor. A different appendage is used for raising or lowering each set of mowing units and at least one hand is free at all times to steer the tractor. There is no need to slow down at the edge of a green in order to facilitate the raising or lowering of the mowing units.

Because the structure is simple, a lightweight and highly maneuverable tractor can be used. Complicated hydraulic mechanisms are not necessary, although they can be used. The unique drive assembly is customed for use in a system wherein the raising and lowering of a bank of mowing units is frequently performed during the course of operation. Furthermore, the unique drive assembly facilitates the use of frame assemblies for banks of mowing units which can be attached to any conventional tractor.

DRAWINGS

A preferred embodiment of the invention will now be described in the specification and appended drawings wherein.

PREFERRED EMBODIMENT

Figure 2:
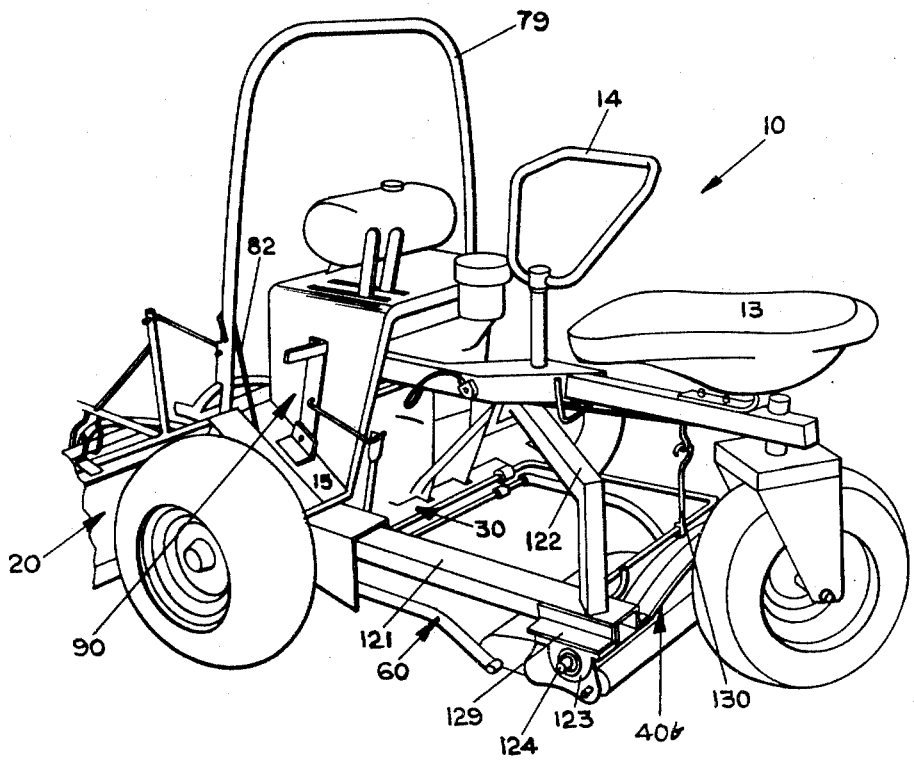
FIG. 2 is a generally rear perspective of the rideable green mower.

The basic components of this embodiment include a tractor 10, front mowing unit frame 20, rear mowing unit frame 30, front mowing units 40a rear mowing unit 40b, front mowing unit yokes 50, rear mowing unit yoke 60, front mowing unit lift assembly 70, rear mowing unit lift assembly 90, front drive assembly 100, and rear drive assembly 120.

Figure 8:
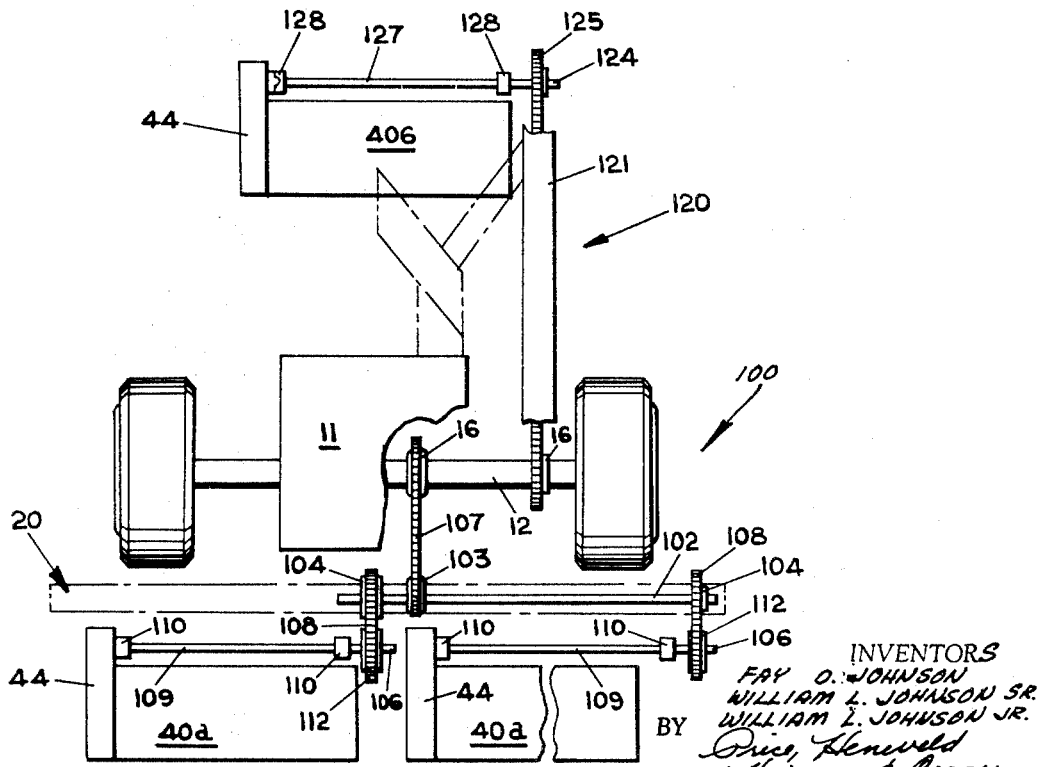
FIG. 8 is a plan view of the mower reel drive assembly.

Tractor 10 is a lightweight tractor (FIGS. 1, 2 and 3), such as that used by Toro in its model 03201 mower. It has a motor 11, shown generally in block form, which is used to drive its front wheels and the reels of the mowing units 40a and 40b. A reel drive shaft 12 is coaxially mounted with the front wheel axle and is operably connected with motor 11 (FIG. 8). Sprockets 16 are mounted on shaft 12, one for transferring rotation to rear mowing unit 40b and one for transferring rotation to front mowing unit 40a. Finally, tractor 10 has a seat 13, a steering wheel 14 and foot rests 15 (FIG. 3).

Figure 3:
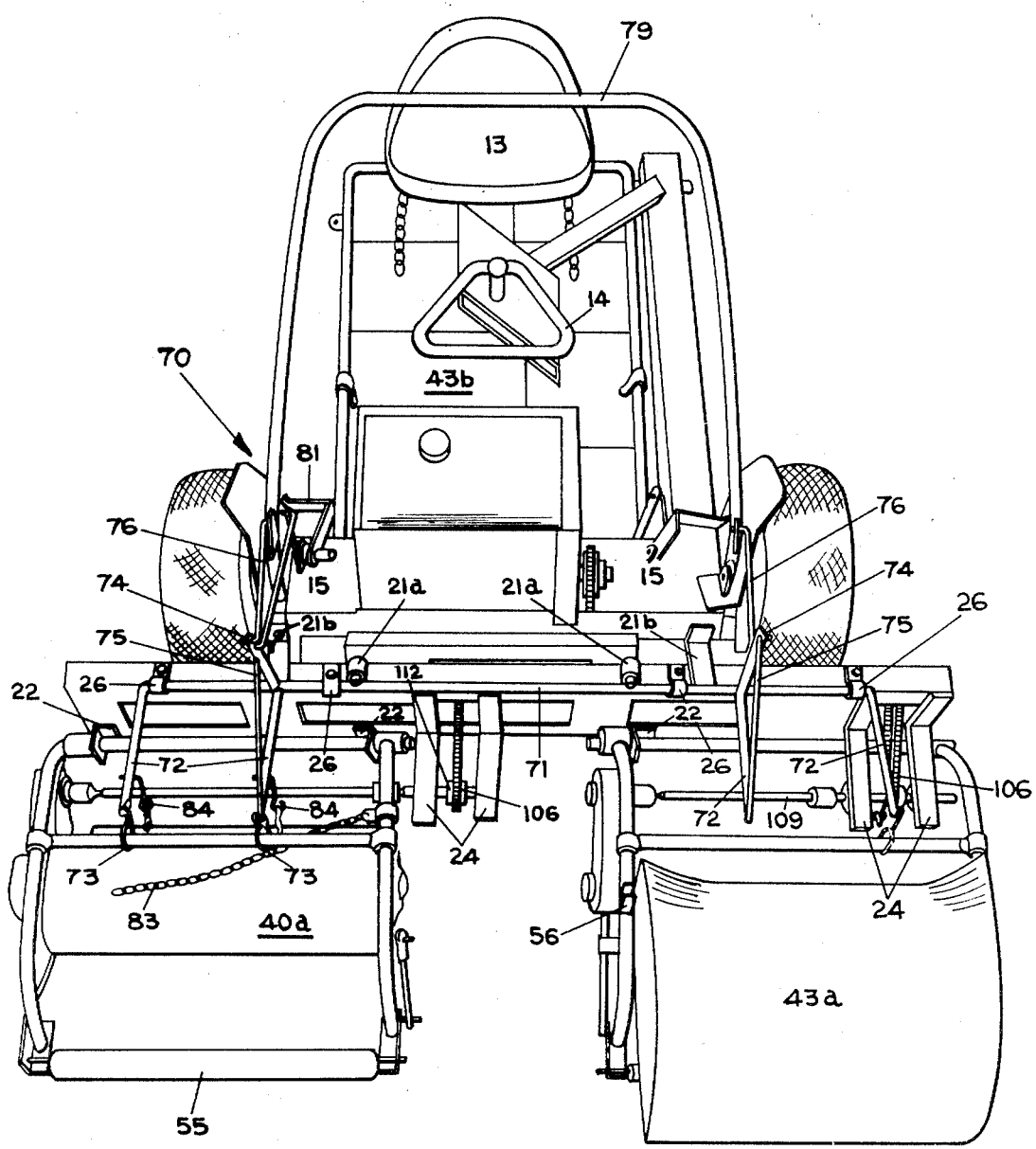
FIG. 3 is an elevated perspective view.

Mower frame 20 is secured to tractor 10 by mountings 21a and mountings 21b (FIG. 3). Mountings 21a are loops which slide over mounting studs extending from tractor 10 and mountings 21b are brackets and bolts which are secured to the main frame of tractor 10.

Figure 6:
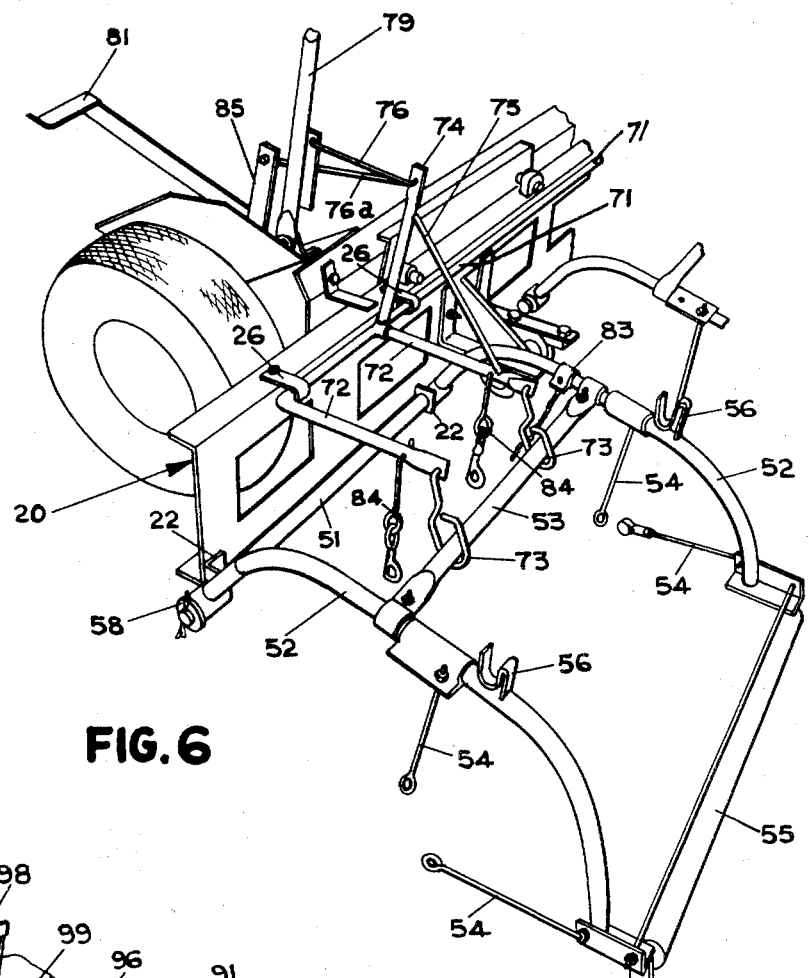
FIG. 6 is an enlarged perspective view of the lift assembly for the front mowing units.
Figure 10:
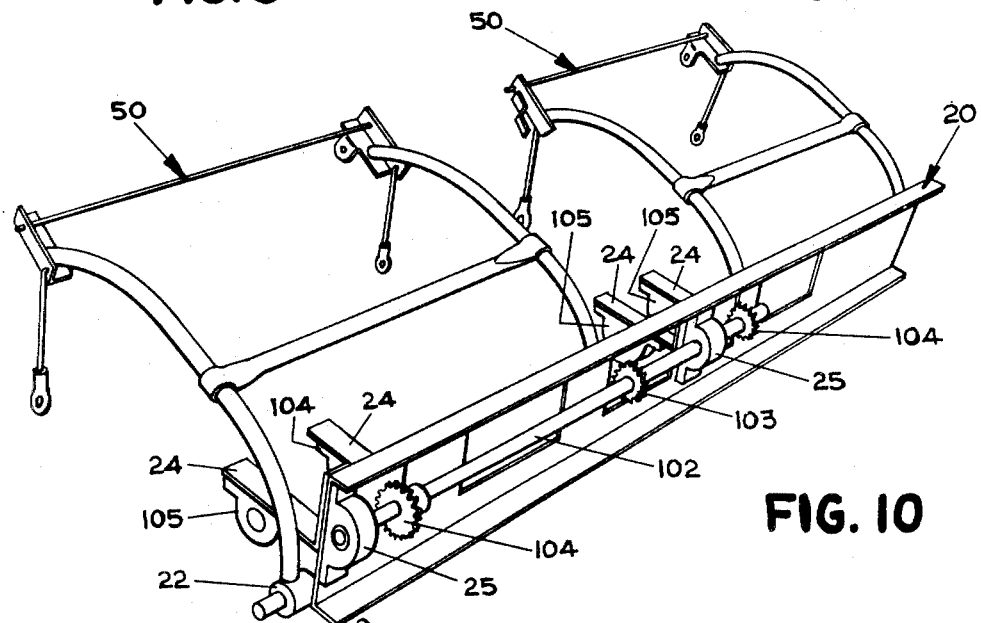
FIG. 10 is a rear perspective of the front mowing unit frame.

Front frame 20 includes a number of other mounting fixtures by which various other sub-assemblies are secured thereto. Yoke mountings 22 are brackets extending from frame 20 near the base thereof having holes for receiving the front mowing unit yokes (FIGS. 3 and 6). Four brackets 24 are secured to frame 20 and have a portion extending therefrom for mounting pillow blocks 105 in which unit drive axles 106 ride (FIG. 3). Two are mounted closely adjacent each other near the end of frame 20 and the other two are mounted closely adjacent each other near the middle of frame 20. Front lift mountings 26 are four small loops at the top of frame 20 through which the front mowing unit lift asembly 70 is in part secured to frame 20. Finally, FIG. 10 shows the main axle pillow blocks 25 which are secured directly to the backside of frame 20.

Figure 11:
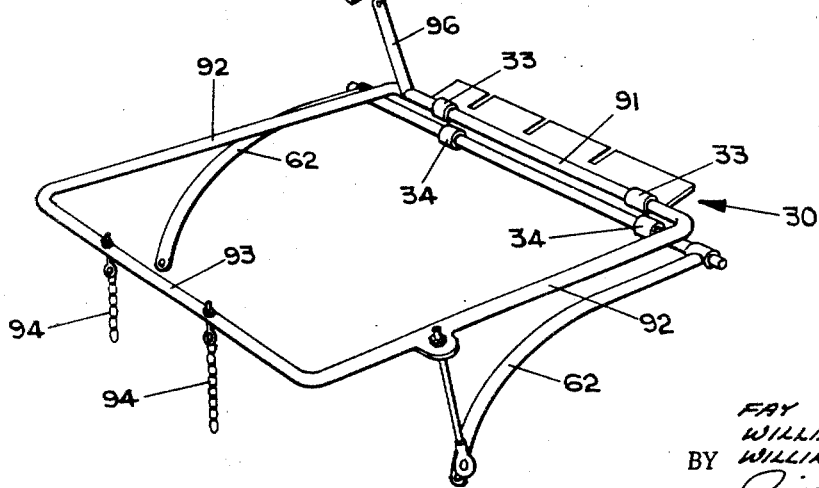
FIG. 11 is a perspective of the rear mowing unit frame.

Rear mower frame 30 is secured to the frame of tractor 10 by means of bolts extending directly through holes 32 in frame 30 and into tractor 10. Rear frame 30 also includes lift assembly mountings 33 which are loops secured to and extending from the top of frame 30 near its ends (FIG. 11). Yoke mountings 34 are comparable loops disposed just below mountings 33.

Front mower yokes 50 are pivotally mounted on frame 20 (FIG. 6). Each includes a mounting shaft 51 extending through and welded to yoke mountings 22. Two arms 52 are then slipped over the opposite ends of mounting shaft 51, each being disposed to the outside of a yoke mounting 22 and each being free to rotate on mounting shaft 51, each being disposed to the outside of a yoke cotter key 58 extending through a hole in each end of mounting shaft 51. The two arms are then integrally connected by cross shaft 53 which is secured at either end to an arm 52.

Roller 55 is mounted at each end to the free end of an arm 52 and acts to support the weight of the yoke 50.

Each arm 52 also includes two mowing unit mounting rods 54, one extending inwardly from the end of arm 52 and the other extending downwardly from a point about one third of the way from said end. There are holes through the free ends of these mounting rods 54 to which a mowing unit 40a can be secured. Also, mounted on each arm 52 is a grass catcher mounting fixture 56 such that a front grass catcher 43a can be secured to or removed from yoke 50 (FIG. 3). Sway chain 83 extends from the left arm of each yoke 50 to the right end of each mowing unit 40a (FIGS. 3 and 6). Finally, there is a roller cleaning rod 57 mounted closely adjacent roller 50 between the ends of arms 52 which acts to scrape excess grass off of roller 55 when the green mower is in operation (FIG. 6).

Figure 1:
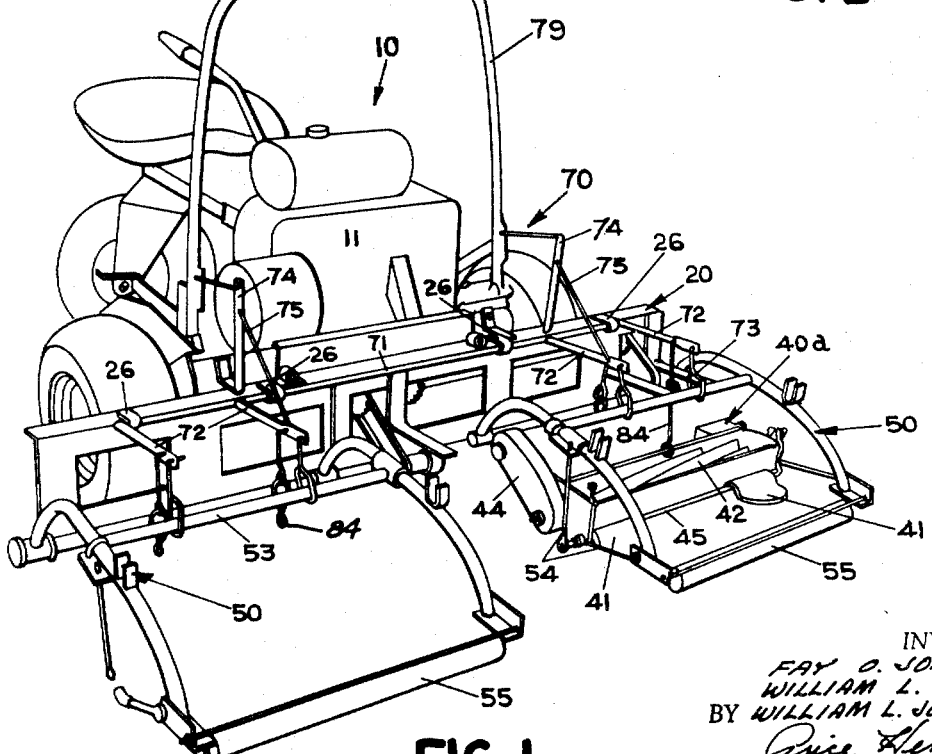
FIG. 1 is a generally front perspective view of the rideable green mower.

Each mowing unit 40a can be a conventional fixture such as the mower assembly portion of a Toro model 04114 green mower. It includes a reel 42, shoes 41 mounted in front of the reel or in the alternative a mowing unit roller, and a reel drive chain assembly 44 (FIG. 1). It also includes a lead rod 45, which is the mounting for shoes 41 or the axle for a roller, the ends of which can extend through the holes in the ends of mowing unit mounting rods 54 such that mowing unit 40a can be secured to front yoke 50. When grass catcher 43a is used, it rests on lead rod 45 and roller cleaning rod 57 as well as being secured in mounting fixtures 56 (FIG. 3).

Figure 7:
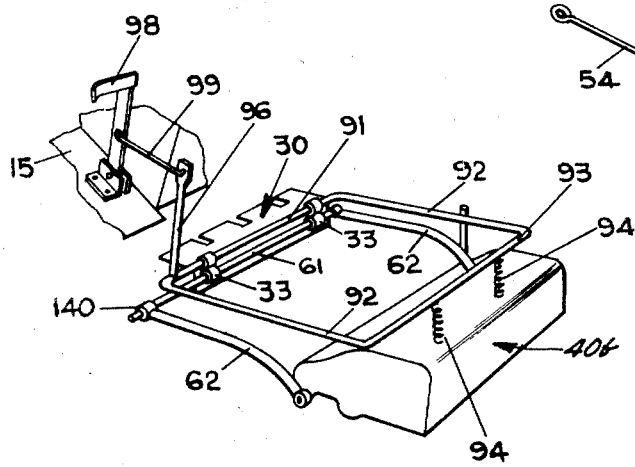
FIG. 7 is an enlarged perspective view of the lift assembly for the rear mowing units.

Rear mowing unit yoke 60 similarly includes a mounting shaft 61 extending through and welded to lift mountings 33 and arms 62 pivotally mounted on the ends thereof (FIG. 7). These arms are held snuggly against lift mountings 33 by means of set screw yokes 140 which are slipped over the ends of mounting shaft 61 and held in place by tightening down a set screw against mounting shaft 61. Each arm 62 has a hole in the end thereof through which a mowing unit 40b can be secured thereto.

Rear mowing unit 40b is identical to the two front mowing units 40a. Each mounting hole 63 in the end of arm 62 slips over the end of lead rod 45 and is held in place by means of cotter keys. Grass catcher 43b is somewhat different from grass catchers 43 in that it has hangers on each side and on its front which hang it over rear mowing unit lift assembly 90 (FIG. 3).

Front mowing unit lift assembly 70 can be seen in FIGS. 1, 3, 4 and 6. For each mowing unit 40a, there is an individual lift means comprising lift levers 72 which extend outwardly from rotatably mounted lift axle 71, which extends almost the length of frame 20, generally horizontal to the ground such that there ends are almost directly above cross shaft 53 of front mowing unit yoke 50. Rotatably mounted lift axle 71 extends through mountings 26 on front frame 20 and rotates therein. A lift lever 72 is secured to and extends outwardly from each end of axle 71 just to the outside of each outer mounting 26 such that it cannot slide laterally in mountings 26. The other two mountings 26 are disposed toward the middle of axle 71 to the insides of the two inside lift levers 72.

Extending generally upwardly from lift axle 71 are two rotating levers 74. Each is welded to axle 71 at the same point at which the inside lift lever 72 is welded thereto and each extends generally vertically upwardly therefrom. A brace rod 75 is secured at one end near the end of inside lift lever 72 and at the other end near the end of rotating lever 75 such that a triangle is formed by each inside lever 72, rotating lever 74 and brace 75 (FIG. 6).

Finally, a lost motion loop 73 is pivotally secured to the end of each lift lever 72 and extends downwardly and is looped around a cross shaft 53. Also, a drop chain 84 extends downwardly from each lift lever 72 and is secured directly to a mowing unit 40a. Thus, each front mowing unit 40a is secured to two lift levers 72, indirectly by means of the two lost motion loops 73 being connected to cross shaft 53 of front yoke 50, and directly by means of the two drop chains 84.

U-lever activating means 79 is a U-shaped member, having two legs and a bite portion, whose function is to activate or rotate lift axle 71. Each leg is pivotally secured to a U-lever mounting bracket which in turn is welded to tractor 10, one mounting bracket being welded to the left foot rest 15 and the other being welded to the right foot rest 15. Each rotating lever 74 is operably connected to one leg of U-levers 79 by means of a connecting rod 76 being pivotally secured at one end to the end of one of the rotating levers 74 and at the other end to a leg of U-lever 79 at a point about six inches above its pivot mounting on mounting 78 (FIG. 6). A securing hook 82 is fastened at one end to the left foot rest 15 of tractor 10 and can be hooked around activating lever 79 to hold both front mowing units 40a in a raised position (FIG. 2).

Because activating lever 79 is U-shaped it is not necessary that lift axle 71 be continuous and thereby operably connect the left rotating lever 74 to the right rotating lever 74 and the left lift levers 72 to the right lift levers 72. Rather, the lift assembly for the left front mowing unit 40a could be independent of the lift assembly for the right front mowing unit 40a since both are connected directly to activating lever 79 and are operably connected therethrough.

On the other hand, the use of a common lift axle 71 facilitates the use of an independent activating means, i.e., foot pedal 81 (FIG. 6). Foot pedal 81 is pivotally secured to a foot pedal mounting bracket which in turn is welded to right foot rest 15 of tractor 10. It includes a foot pedal lever 85 welded to it and extending a few inches upwardly from its pivot point on foot pedal mounting bracket 80. Connecting rod 76a is pivotally connected at one end to the end of the inside right rotating lever 74 and is pivotally connected at its other end to the end of foot pedal lever 85. Because rotating axle 71 is common to both the left and right lift assemblies, the operation of foot pedal 81 raises or lowers both front mowing units 40 and foot pedal 81 can be used as an alternative activating means to activating lever 79.

Figure 5:
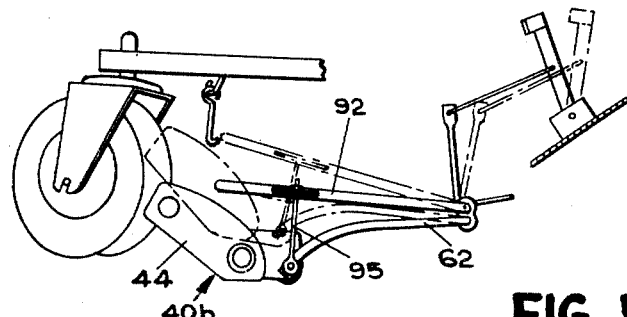
FIG. 5 is a side view of the rear mower assembly in its lowered position with its raised position being shown in phantom.

Rear lift assembly 90 is best seen in FIGS. 2, 5, 7 and 11 and is very similar in operation to front lift assembly 70. A large rectangle member made of ¾ inch pipe effectively creates a rotating lift axle 91, two lift levers 92 and a lift lever connecting bar 93. Rotating lift axle 91 extends through mountings 33 and rotates therein (FIG. 11). Each lift lever 92 extends outwardly from rotating lift axle 91 generally horizontal to the ground and out over rear mowing unit 40b (FIG. 5). Each is located just to the outside of a rear lift assembly mounting 33 such that rotating lift axle 91 cannot slide laterally in mountings 33 (FIG. 11). Lost motion chains extend downwardly from fixed positions on lever connecting bar 93 to rear mowing unit 40 where they are secured (FIG. 7). Thus, instead of dropping directly from a lift lever as do lost motion loops 73, the mowing unit connecting chains 94 for rear lift assembly 90 drop down from bar 93 which joins lift levers 92. Rotating lever 96 is welded to axle 91 and extends generally vertically upwardly therefrom.

Foot pedal 98 is pivotally mounted on a foot pedal mounting bracket which in turn is welded to the left foot rest area 15 of tractor 10 (FIG. 7). Connecting rod 99 is pivotally connected at one end to the end of rotating lever 96 and at the other end to foot pedal 98, a few inches up from its pivot point in mounting bracket 97. Thus, foot pedal 98 can be pushed forward with the left foot to raise rear mowing unit 40b. Securing hook 130 extends downwardly from the frame of tractor 10 at a point beneath seat 13 and it can be hooked around connecting bar 93 to maintain mowing unit 40b in a raised position (FIG. 2).

Finally, rod 95 is rigidly but slideably secured in a fixture welded to the right lift lever 92 and extends downwardly to the corresponding arm 62 of rear mower yoke 60 where it is secured to arm 62 (FIG. 5). This prevents rear mowing unit 40b from swaying laterally when it is raised off the ground. The fact that rod 95 is slideably mounted provides a lost motion feature which allows mowing unit 40b to flow smoothly over deviations in the green surface.

Front drive assembly 100, which can be seen generally in FIG. 8, makes possible a lift assembly which will raise both front mowers simultaneously. Further, it facilitates the use of front mower frame 20 to which the various components are secured and which can itself be secured to almost any tractor 10. It includes main drive axle 102 mounted in the back of front frame 20 between two main axle pillow blocks 25 (FIG. 10). It is held in place by two set screw yokes one being positioned just to the outside of each main axle pillow block 25. It includes two sprockets 104 each disposed near the ends of main drive axle 102 with one being disposed just inside of one pillow block 25 and the other being disposed just to the outside of the other pillow block 25. A third sprocket, designated number 103, is disposed near the middle of front frame 20 between both sprockets 104 and between both pillow blocks 25. A main drive transfer chain 107 connects sprocket 103 to a sprocket 16 on motor reel drive shaft 12. In this manner, the rotation of motor reel drive shaft 12 is transferred to main drive axle 102 (FIG. 8).

Figure 9:
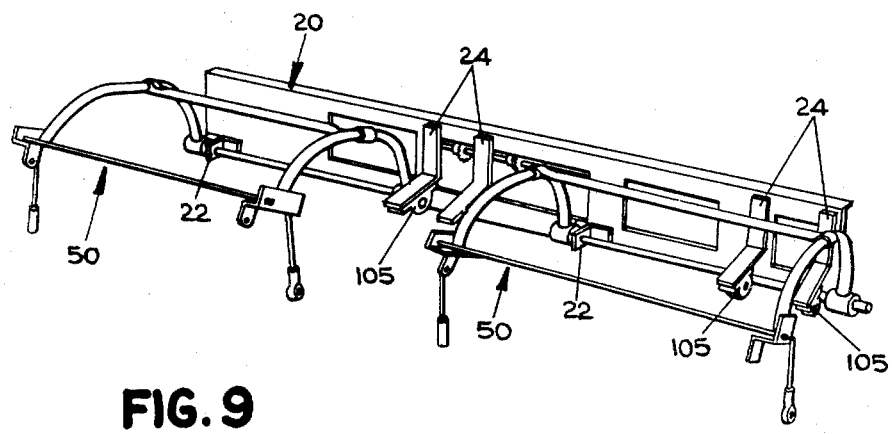
FIG. 9 is a front perspective of the front mowing unit frame.

Mounted on the bottom of the extending portion of each axle bracket 24 is a unit axle pillow block 105 (FIGS. 8, 9 and 10). A short drive shaft or mowing unit drive shaft 106 extends between and rotates in pillow blocks 105 (FIG. 3). It is also held in place by set screw yokes disposed to the outside of the two pillow blocks 105. It includes a sprocket 112 mounted thereon between each of the two pillow blocks 105. A unit drive transfer chain 108 operably connects each sprocket 104 to the sprocket 112 on the respective unit drive shaft 106 which is mounted in line with it. In this fashion, the rotation of main drive axle 102 is transferred to each unit shaft 106.

The reel drive chain 44 of each mowing unit 40a is disposed on right side of its mowing unit 40a. On the other hand, each unit drive axle is disposed toward the left side of its respective mowing unit 40a such that identical front units 40a can be used. Each reel drive chain 44 is operably connected to its respective unit drive shaft 106 by transfer shaft 109, the connection between transfer shaft 109 and reel drive chain 44 comprising a universal joint 110 and the connection between unit drive shaft 106 and transfer shaft 109 similarly comprising a universal joint 110. Transfer shaft 109 is preferably a long shaft, in the case having a length equal to about ¾ of the width of each mowing unit 40, in order to more readily accommodate the misalignment between reel drive chain 44 and unit drive shaft 106 which occurs when each mowing unit 40 is raised or lowered. It also aids in preventing misalignment of drive members and chains jumping their sprockets when the mowers move up and down over the irregular surface of a green. Each sway chain 83, by preventing lateral swaying in the front mowing units 40a when they are raised, helps prevent the end of transfer shaft 109 from jumping out of its connection with either reel drive chain 44 or unit drive shaft 106. The various drive members are arranged such that both front mowing units 40a can be identical.

Rear drive assembly 120, shown generally in FIGS. 2 and 8, can be less complicated in this embodiment since rear frame 30 only has one mowing unit 40b connected thereto. It includes a channel iron frame extension 121 (FIG. 2) which extends outwardly from the frame of tractor 10 to a point over the left end mowing unit 40b. A securing bracket 122 extends outwardly from the frame of tractor 10 and downwardly to frame extension 121 and is welded thereto to help support the free end thereof. A pillow block bracket 129 is then welded to either side of frame extension 121 near the end thereof. A pillow block 123 is then secured to the bottom of each bracket 129 and a unit drive shaft 124 (FIG. 8) including a sprocket 125 disposed between the two pillow blocks 123, is rotatably mounted between pillow blocks 123 and is held in place by means of set screw yokes. A drive chain 126 extends around a sprocket 16 on motor reel drive shaft 12 and around sprocket 125 on unit drive shaft 124. Frame extension 121 encloses drive chain 126 and thereby prevents possible injury to an operator when it is in motion.

As with each front mower 40a, the unit drive shaft 124 is disposed at the left side of mowing unit 40b while the reel drive chain 44 is disposed on the right side of mowing unit 40b such that unit 40b can be identical to units 40a. A long transfer shaft 127 operably connects drive chain 44 to unit drive shaft 124 and the respective connections comprise universal joints 128. As with each front mower 40a, the length of transfer shaft 127 allows for misalignment between drive chain 44 and unit drive shaft 124 when mowing unit 40b is raised and lowered. Rod 95, which joins right lift lever 92 to right arm 62 helps prevent transfer shaft 127 from jumping out of engagement with either reel drive chain 44 or unit drive shaft 124 by preventing lateral swaying in mowing unit 40b.

OPERATION

To mow a green, the operator riding on seat 13 engages drive clutch 18 and engages reel drive clutch 16 and begins traveling over the green surface. The engagement of reel drive clutch 17 rotates reel drive shaft 12 which in turn rotates main drive axle 102 which in turn rotates the two front unit drive shafts 106, the front drive transfer shafts 109, and the reel drive chains 44 of the front mowing units 40a. Similarly, the rotation of motor reel drive shaft 12 imparts rotation to rear unit drive shaft 124, rear transfer shaft 127 and reel drive chain 44 of rear mowing unit 40b.

As the green mower moves over the green, all three mowing units are free to individually move up and down and hence follow deviations in the green surface. This is made possible because arms 52 of the front yokes 50 pivot on mounting shaft 51, because each mowing unit 40a in turn pivots about its connection to rods 54 which extend from arms 52, and because the other connections joining each mowing unit 40a to its front yoke 50 and to its front mower lift assembly 70 include lost motion member, i.e., lost motion loops 73, drop chains 84, and sway chains 83.

In a similar fashion, rear mowing unit 40b is free to follow deviations in the green surface because arms 62 of rear yoke 60 pivot about mounting shaft 61, because mowing unit 40b pivots about its connection to the ends thereof, and because the other connections of mowing unit 40b to rear lift assembly 90 include lost motion member, i.e., chains 94 and the vertically slideable rod 95 which connects rear yoke 60 to rear lift assembly 90.

Figure 4:
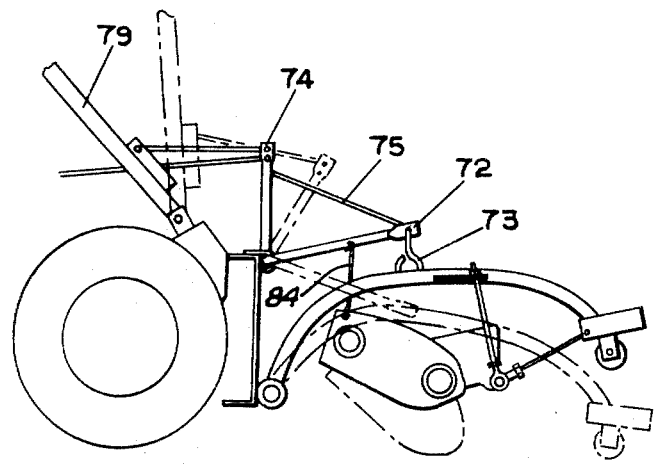
FIG. 4 is a side view of the front mower assembly in its raised position with its lowered position being shown in phantom.

The operator steers tractor 10 with one hand on steering unit 14. When he reaches the edge of the green, he raises both front mowing units 40a either by using his free hand to pull back on U-lever 79 or by depressing foot pedal 81 with his right foot. The operation of U-lever activating means 79 pulls back on both rotating levers 74, thus rotating rotating lift axle 71 and raising the ends of lift levers 72 such that lost motion loops 73 raise their respective front mowing unit yokes 50 and correspondingly raise mowing units 40a. Drop chains 84 raise the rear of front mowing units 40a. In this fashion, front mowing units 40a are raised off the green at the edge thereof such that they do not cut into the green apron. In the alternative, the operator could depress foot pedal 81 which would pull back on right rotating lever 74 and thereby rotate rotating axle 71 and accomplish the same end (FIG. 4).

Then as he passes over the edge of the green, the operator uses his left foot to depress foot pedal 98. This pulls on rotating lever 96 which rotates axle 91 and thereby raises the ends of lift levers 92 and lever connecting bar 93. Chains 94 extending from connecting bar 93 to mower unit 40b act to raise the rear of mowing unit 40b. Rod 95 extending from right left lever 92 to rear yoke 60 acts to raise rear yoke 60 and thereby raise the front end of mowing unit 40b (FIG. 5).

By individually raising the front and rear sets of mowing units, the operator does not cut into the apron which surrounds the green and yet he does cut a single swath of grass right up to the edge of the green where the apron begins. Furthermore, the operator uses a separate and distinct appendage to operate either of the front activating means and the rear activating means and in this fashion doesn't have to go through a lot of confusing wasted motion in shifting from one activating means to another. Furthermore, he has one hand free at all times to steer tractor 10. Further, if he uses U-lever 79 to raise front mowing units 40a, he has a foot which is free to operate a foot brake.

The operator then turns tractor 10 around on the apron of the green and heads back towards the green. Because the respective front and rear lift assemblies are unique and lightweight in construction, a very small and lightweight tractor is used and hence the turning maneuver requires only eight feet at the most. Thus, the turning can be done even when there is a bunker, water hazard, sand trap or other hazard fairly close to the green. During all this time, the operator keeps his left foot on foot pedal 98 such that it is depressed and he either keeps his right foot on foot pedal 81 or his free hand on U-lever 79 such that either the former is depressed or the latter is pulled back. As he approaches the edge of the green, he first allows U-lever 79 or foot pedal 81 to return to its original position and thereby lowers mowing units 40a onto the green. As he passes over the edge of the green, he releases foot pedal 98 and thereby allows rear mowing unit 50b to lower to the green. Another swath is cut in the surface of the green and the raising operation is repeated at the edge thereof.

When the front mowing units 40a are in their raised position, sway chains 83 prevent lateral swaying thereof and thereby maintain the connections between transfer shafts 109 and reel drive chains 44 or unit drive shafts 106. In a similar fashion, rod 95 prevents lateral swaying in rear mowing unit 40b and thereby maintains the connection between transfer shaft 127 and reel drive chain 44 or unit drive shaft 124.

When storing the green mower or transferring it over long distances, the front mowing units can be maintained in a raised position by hooking securing hook 82 around the left leg of U-lever 79 and the rear mowing unit 40b, can be maintained in a raised position by hooking securing hook 130 around foot pedal 98.

If one desires to use more mowing units, he could do so simply by adding equal numbers of mowing units to the front and rear sets. Rear mowing unit frame 30 would have to be modified to correspond generally to front unit frame 20. The only limitation on adding mowing units are that the weight of the overall green mower must be kept down such that tracking in the green is eliminated and the rideable green mower must be amenable to use on greens which do not have straight edges.

Both the front and rear mowing unit assemblies are connected to frames which can be secured to any conventional rideable tractor. In the preferred embodiment, only activating U-lever 79, activating foot pedal 81 and activating foot pedal 98 are secured to tractor 10 by means other than through front mower frame 20 or through rear mower frame 30. While connection is easily facilitated, there is no reason why these activating means could not be mounted on members extending over tractor 10 from front mower frame 20 and rear mower frame 30 respectively.

Thus, it can be seen that this invention provides a structure in which a front set of mowing units can be simultaneously raised and lowered separately from the simultaneous raising and lowering of a rear set of mowing units frequently and as a matter of course in the operation of the rideable green mower. A different appendage can be used to raise and lower each set of mowing units separately and thereby avoid confusing wasted motion in shifting between separate activating means for the separate sets of mowing units. At least one hand is free at all times to steer tractor 10 and it is possible to have one foot free for braking. There is no need to slow down at the edge of the green in order to accomplish the raising and lowering operation, and the maneuverability of the rideable green mower is extremely high. Because hydraulics are not a necessity, the danger of oil spots and oil streaks on the green surface is eliminated. Finally, this unique drive assembly is custom made for raising and lowering a plurality of identical mowing units. Furthermore, it facilitates the use of frames which can be mounted on any conventional rideable tractor.

It is understood that the above is merely a preferred embodiment of my invention and that many changes and alterations can be made thereof without departing from the broader aspects in spirit of the invention.

The embodiments of the invention in which an exclusive property or privilege is claimed are defined as follows:

1. A rideable green mower operable by a single operator comprising: a tractor; a first set of mowing units mounted on said tractor, said mowing units in said first set being mounted adjacent each other; a second set of mowing units mounted on said tractor, said mowing units in said second set being mounted adjacent each other; each mowing unit in said second set being wider than the space between adjacent mowers in said first set; each space between adjacent mowing units in said first set being in line with a mowing unit in said second set such that said first and second sets of mowing units cut a single swath of grass; lift means operably connected to each of said mowing units in said first set; lift means operably connected to each of said mowing units in said second set; a first activating means operably connected with said lift means of said first set of mowing units and a second activating means operably connected with said lift means of said second set of mowing units; each of said first and second activating means activating said lift means in said first and second sets of mowing units respectively to simultaneously raise or lower said mowing units in said set when operated by said operator; one of said first and second activating means being operable by said operator's use of a first one of his appendages and the other of said first and second activating means being operable by said operator's use of a second one of his appendages.

2. The mower of claim 1 which also comprises: each of said lift means of said first and second sets of mowing units comprising an individual lift means for each of said mowing units; each of said individual lift means being operably connected to one of said mowing units; said individual lift means in each set being operably connected by connecting means for each set.

3. The device of claim 2 in which said connecting means comprises an axle rotatably mounted on said tractor for each set of mowing units; each of said individual lift means for said first set being operably connected to said axle for said first set such that rotation of said axle in one direction raises said mowing units in said first set while rotation in the other direction lowers said mowing units in said first set; each of said individual lift means for said second set being operably connected to said axle for said second set such that rotation of said axle in one direction raises said mowing units in said second set while rotation in the other direction lowers said mowing units; said first activating means being operably connected to said axle for said first set and said second activating means being operably connected to said axle for said second set.

4. The device of claim 3 which also comprises: each of said individual lift means of each of said first and second sets of mowing units including a lift lever extending generally outwardly from said axle and over said mowing units; each of said axles for said first and second sets including a rotating lever extending generally upwardly from said axle; means operably connecting said rotating lever on said axle for said first set to said first activating means; and means operably connecting said rotating lever on said axle for said second set to said second activating means.

5. The mower of claim 1 which also comprises: one of said first and second activating means including a hand lever and a foot pedal, said hand lever being positioned in range of one of said operator's hands and said foot pedal being positioned in range of one of said operator's feet; each of said hand lever and foot pedal being operably connected to said lift means of one of said first and second sets of mowing units such that said set of mowing units responds to the individual operation of one of said hand lever and said foot pedal.

6. The mower of claim 3 which also comprises: one of said first and second activating means including a hand lever and a foot pedal, said hand lever being positioned in range of one of said operator's hands and said foot pedal being positioned in range of one of said operator's feet; each of said hand lever and foot pedal being operably connected to said lift means of one of said first and second sets of mowing units such that said set of mowing units responds to the individual operation of one of said hand lever and said foot pedal.

7. The mower of claim 4 which also comprises: one of said first and second activating means including a hand lever and a foot pedal, said hand lever being positioned in range of one of said operator's hands and said foot pedal being positioned in range of one of said operator's feet; each of said hand lever and foot pedal being operably connected to said lift means of one of said first and second sets of mowing units such that said set of mowing units responds to the individual operation of one of said hand lever and said foot pedal.

8. The mower of claim 1 which also comprises one of said first and second appendages being a hand and the other of said first and second appendages being a foot.

9. The mower of claim 4 which also comprises one of said first and second appendages being a hand and the other of said first and second appendages being a foot.

10. The mower of claim 1 which also comprises: each of said mowing units having reels; a motor on said tractor for driving said reels; a main drive shaft; a main drive transfer means operably connecting said main drive shaft to said motor; a unit drive shaft operably connected to each of said reels; a unit drive transfer means operably connecting each of said unit drive shaft to said main drive shaft; said unit drive shaft being approximately comparable in length to the length of said mowing unit.

11. The mower of claim 2 which also comprises: each of said mowing units having reels; a motor on said tractor for driving said reels; a main drive shaft; a main drive transfer means operably connecting said main drive shaft to said motor; a unit drive shaft operably connected to each of said reels; a unit drive transfer means operably connecting each of said unit drive shafts to said main drive shaft; said unit drive shaft being approximately comparable in length to the length of said mowing unit.

12. The mower of claim 3 which also comprises: each of said mowing units having reels; a motor on said tractor for driving said reels; a main drive shaft; a main drive transfer means operably connecting said main drive shaft to said motor; a unit drive shaft operably connected to each of said reels; a unit drive transfer means operably connecting each of said unit drive shafts to said main drive shaft; said unit drive shaft being approximately comparable in length to the length of said mowing unit.

13. The mower of claim 4 which also comprises: each of said mowing units having reels; a motor on said tractor for driving said reels; a main drive shaft; a main drive transfer means operably connecting said main drive shaft to said motor; a unit drive shaft operably connected to each of said reels; a unit drive transfer means operably connecting each of said unit drive shafts to said main drive shaft; said unit drive shaft being approximately comparable in length to the length of said mowing unit.

14. The mower of claim 5 which also comprises: each of said mowing units having reels; a motor on said tractor for driving said reels; a main drive shaft; a main drive transfer means operably connecting said main drive shaft to said motor; a unit drive shaft operably connected to each of said reels; a unit drive transfer means operably connecting each of said unit drive shafts to said main drive shaft; said unit drive shaft being approximately comparable in length to the length of said mowing unit.

15. The mower of claim 9 which also comprises: each of said mowing units having reels; a motor on said tractor for driving said reels; a main drive shaft; a main drive transfer means operably connecting said main drive shaft to said motor; a unit drive shaft operably connected to each of said reels; a unit drive transfer means operably connecting each of said unit drive shafts to said main drive shaft; said unit drive shaft being approximately comparable in length to the length of said mowing unit.

16. For use on a tractor, a means for making said tractor into a rideable green mower operable by an operator comprising: frame means to be operably connected to said tractor; at least two sets of mowing units operably connected to said frame means; a separate lift means being operably connected to each set of said mowing units; separate activating means operably connected with each of said lift means of said sets of mowing units; said activating means for each of said sets activating said lift means to raise or lower all of said mowing units in its set when operated by said operator; one of said activating means being operable by said operator's use of a first one of his appendages and the other of said activating means being operable by said operator's use of a second one of his appendages.

17. For use on a tractor, a means for making said tractor into a rideable green mower operable by an operator comprising: frame means to be operably connected to said tractor; a set of mowing units operably connected to said frame means; lift means being operably connected to said set of mowing units; said lift means comprising an individual lift means for each of said mowing units; each of said individual lift means being operably connected to one of said mowing units; said individual lift means being operably connected by connecting means mounted on said frame; activating means operably connected with said lift means of said set of mowing units; said activating means activating said lift means to raise or lower all of said mowing units in said set when operated by said operator; said activating means being operable by said operator's use of one of his appendages.

18. The frame means of claim 17 in which said connecting means comprises an axle rotatably mounted on said frame means; each of said individual lift means being operably connected to said axle such that rotation of said axle in one direction raises said mowing units while rotation in the other direction lowers said mowing units; said activating means being operably connected to said axle.

19. The frame means of claim 18 which also comprises: each of said individual lift means including a lift lever extending generally outwardly from said axle and over said mowing unit; a rotating lever extending generally upwardly from said axle; means operably connecting said rotating lever to said activating means.

20. The frame means of claim 16 which also comprises: each of said mowing units having reels; a motor on said tractor for driving said reels; a main drive shaft operably mounted on said frame means; a main drive transfer means operably connecting said main drive shaft to said motor; a unit drive shaft mounted on said frame means and operably connected to each of said reels; a unit drive transfer means operably connecting each of said unit drive shafts to said main drive shaft.

21. The frame means of claim 17 which also comprises: each of said mowing units having reels; a motor on said tractor for driving said reels; a main drive shaft operably mounted on said frame means; a main drive transfer means operably connecting said main drive shaft to said motor; a unit drive shaft mounted on said frame means and operably connected to each of said reels; a unit drive transfer means operably connecting each of said unit drive shafts to said main drive shaft.

22. The frame means of claim 18 which also comprises: each of said mowing units having reels; a motor on said tractor for driving said reels; a main drive shaft operably mounted on said frame means; a main drive transfer means operably connecting said main drive shaft to said motor; a unit drive shaft mounted on said frame means and operably connected to each of said reels; a unit drive transfer means operably connecting each of said unit drive shafts to said main drive shaft.

23. The frame means of claim 19 which also comprises: each of said mowing units having reels; a motor on said tractor for driving said reels; a main drive shaft operably mounted on said frame means; a main drive transfer means operably connecting said main drive shaft to said motor; a unit drive shaft mounted on said frame means and operably connected to each of said reels; a unit drive transfer means operably connecting each of said unit drive shafts to said main drive shaft.

24. A rideable green mower operable by a single operator comprising: a tractor; a first set of two mowing units mounted on said tractor; each of said mowing units having an individual lift means operably connected thereto for raising and lowering said mowing units; a generally U-shaped lever having two legs, each of said legs being pivotally mounted on said tractor; said U-shaped lever being within range of one of said operator's appendages, one of said lift means operably connected to one of said legs of said U-shaped lever and the other of said lift means being operably connected to the other of said legs of said U-shaped lever such that the pivoting of said lever in one direction raises said mowing units and the pivoting of said lever in the other direction lowers said mowing units.

25. The mower of claim 24 which also comprises; each of said lift means comprising a lift lever being rotatably mounted on said tractor and extending out over said mowing unit; a rotating lever being operably connected to said lift lever and extending upwardly therefrom; means operably connecting said rotating lever to said lever.

26. The mower of claim 24 which also comprises: a connecting axle operably connecting said two lift means; said lever being operated by said operator's use of one of his hands; a foot pedal operably connected to one of said lift means such that the movement of said foot pedal in one direction simultaneously raises both of said mowing units and the movement of said foot pedal in the other direction simultaneously lowers both of said mowing units.

27. The device of claim 26 which also comprises: each of said lift means comprising a lift lever being rotatably mounted on said tractor and extending out over said mowing unit; a rotating lever being operably connected to said lift lever and extending upwardly therefrom; said foot pedal being operably connected to one of said rotating levers.

28. The frame means of claim 20 which also comprises: said unit drive shaft being approximately comparable in length to the length of said mowing unit.

29. The frame means of claim 21 which also comprises: said unit drive shaft being approximately comparable in length to the length of said mowing unit.

30. The frame means of claim 22 which also comprises: said unit drive shaft being approximately comparable in length to the length of said mowing unit.

31. The frame means of claim 23 which also comprises: said unit drive shaft being approximately comparable in length to the length of said mowing unit.

32. The device of claim 16 which includes said lift means comprising an individual lift means for each of said mowing units; each of said individual lift means being operably connected to one of said mowing units; said individual lift means in each separate set being operably connected by connecting means for each separate set.

33. The device of claim 32 in which said connecting means comprises an axle rotatably mounted on said tractor for each set of mowing units; each of said individual lift means for a given set being operably connected to said axle for said set such that rotation of said axle in one direction raises said mowing units while rotation in the other direction lowers said mowing units; said activating means for said set being operably connected to said axle.

34. The device of claim 33 which includes each of said individual lift means including a lift lever extending generally outwardly from said axle and over said mowing units; each of said axles for said separate sets including a rotating lever extending generally upwardly from said axle; means operably connecting said rotating lever on a given axle to said activating means for said axle.

References Cited

UNITED STATES PATENTS

| | | |
|---|---|---|
| 1,320,098 | 10/1919 | Sawtelle. |
| 1,320,151 | 10/1919 | Kimball. |
| 1,994,929 | 3/1935 | Stegeman. |
| 2,099,902 | 11/1937 | Moyer et al. |
| 2,996,867 | 8/1961 | Williams. |
| 3,097,465 | 7/1963 | Williams. |
| 3,410,063 | 11/1968 | Speiser. |
| 3,429,110 | 2/1969 | Strasel. |

ROBERT PESHOCK, Primary Examiner

PO-1050
(5/69)

UNITED STATES PATENT OFFICE
CERTIFICATE OF CORRECTION

Patent No. 3,516,233      Dated June 23, 1970

Inventor(s) Fay O. Johnson, William L. Johnson Sr., William L. Johnson Jr.

It is certified that error appears in the above-identified patent and that said Letters Patent are hereby corrected as shown below:

Column 1, Line 48:

After "least" insert --- two ---;

Column 3, Line 69:

After "51" delete ", each being disposed to the outside of a yoke" and substitute therefor --- . They are then held in place by means of a ---.

SIGNED AND SEALED
NOV 10 1970

(SEAL)
Attest:

Edward M. Fletcher, Jr.
Attesting Officer

WILLIAM E. SCHUYLER, JR.
Commissioner of Patents